United States Patent [19]

Westerlund

[11] Patent Number: 5,577,055
[45] Date of Patent: Nov. 19, 1996

[54] METHOD AND CIRCUIT DEVICE TO CONTROL A MEMORY

[75] Inventor: Ewa C. Westerlund, Gustafsberg, Sweden

[73] Assignee: Telefonaktiebolaget L M Ericsson, Stockholm, Sweden

[21] Appl. No.: 421,972

[22] Filed: Apr. 14, 1995

[30] Foreign Application Priority Data

Apr. 19, 1994 [SE] Sweden .................................. 9401318

[51] Int. Cl.$^6$ ........................... G06F 11/10; H03H 13/00
[52] U.S. Cl. ........................................ 371/51.1; 371/49.1
[58] Field of Search ................................. 371/51.1, 49.1, 371/48, 37.7, 2.2, 21.1, 21.2, 49.2

[56] References Cited

U.S. PATENT DOCUMENTS

| | | | |
|---|---|---|---|
| 4,019,033 | 4/1977 | Parmet | 235/153 AM |
| 4,271,521 | 6/1981 | Mahmood | 371/51.1 |
| 4,692,893 | 9/1987 | Casper . | |
| 4,809,278 | 2/1989 | Kim et al. | 371/51 |
| 5,477,553 | 12/1995 | Kong | 371/51.1 |

FOREIGN PATENT DOCUMENTS

| | | |
|---|---|---|
| 084460 | 7/1983 | European Pat. Off. . |
| 499052 | 10/1991 | European Pat. Off. . |
| 463210 | 1/1992 | European Pat. Off. . |
| 531599 | 3/1993 | European Pat. Off. . |
| 544964 | 6/1993 | European Pat. Off. . |
| 545575 | 6/1993 | European Pat. Off. . |

OTHER PUBLICATIONS

J. D. Dixon et al., "Parity Mechanism for Detecting Both Address and Data Errors," IBM Technical Bulletin, vol. 24, No. 1B, p. 794 (Jun. 1981).

Primary Examiner—Robert W. Beausoliel, Jr.
Assistant Examiner—Phung My Chung
Attorney, Agent, or Firm—Burns, Doane, Swecker & Mathis, L.L.P.

[57] ABSTRACT

A method and a circuit device control insertion and storage of digital information in a memory and retrieval of the information from the memory. The method and circuit device ensure the digital information is correctly read out of the memory in the form of a number of coordinated bit positions, and the digital information is used to control one or several functions. The information intended to be inserted into the memory is given an address belonging to the memory. First control-sum-carrying bit positions are calculated from the bit positions of the digital information and their values coming into the memory according to a selected evaluation function. The bit positions of the digital information are stored in an address within the memory, and the first control-sum-carrying bit positions are stored in an address within a control memory. Second control-sum-carrying bit positions are calculated when the bit positions of the digital information stored in the address in the memory are read out according to the selected evaluation function. The bit positions of the read information, and their values, are accepted as correct, and a circuit is activated through a signal on a conductor, if a following comparison between the first and second control-sum-carrying bit positions shows that they are identical.

26 Claims, 6 Drawing Sheets

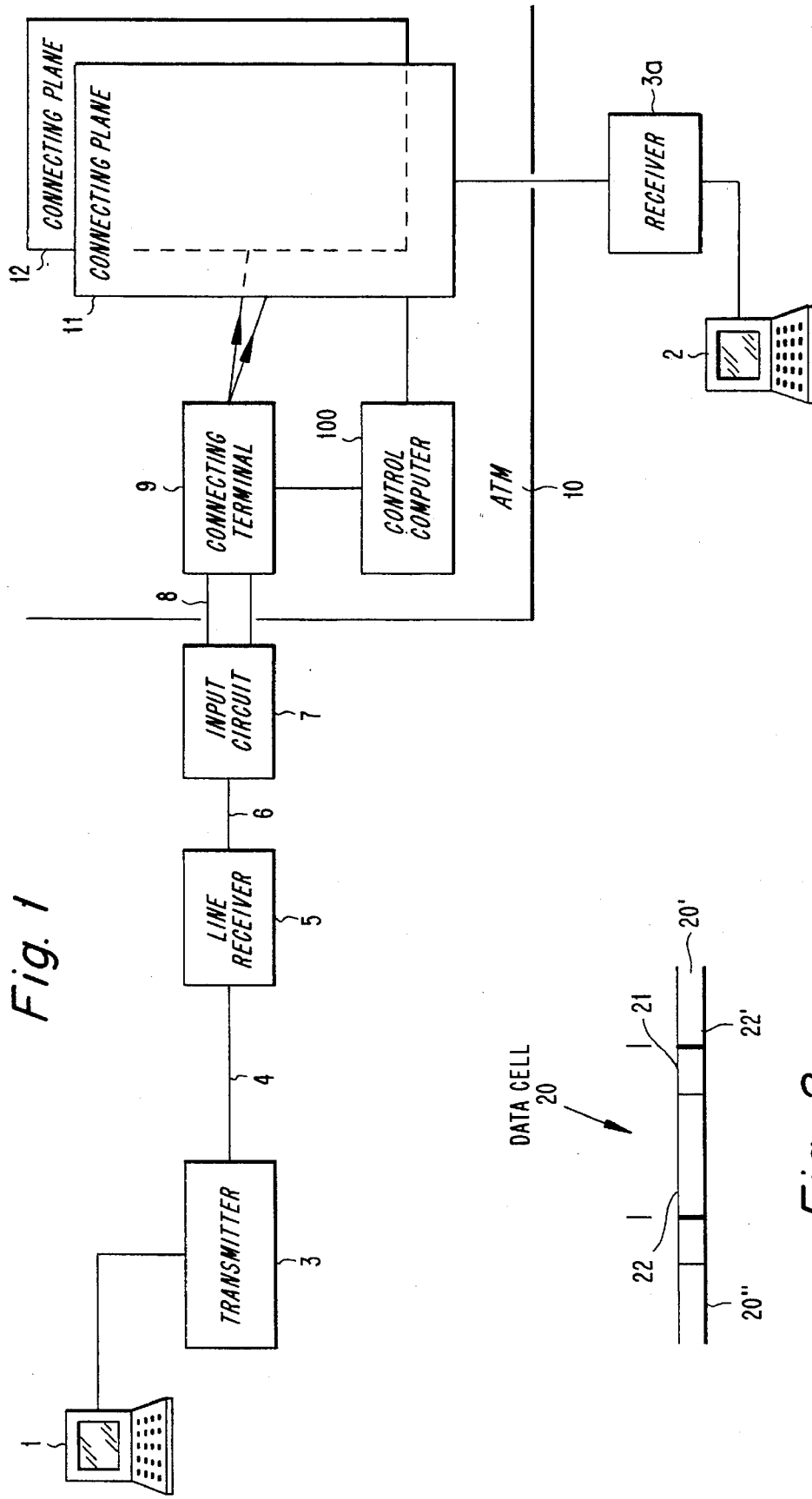

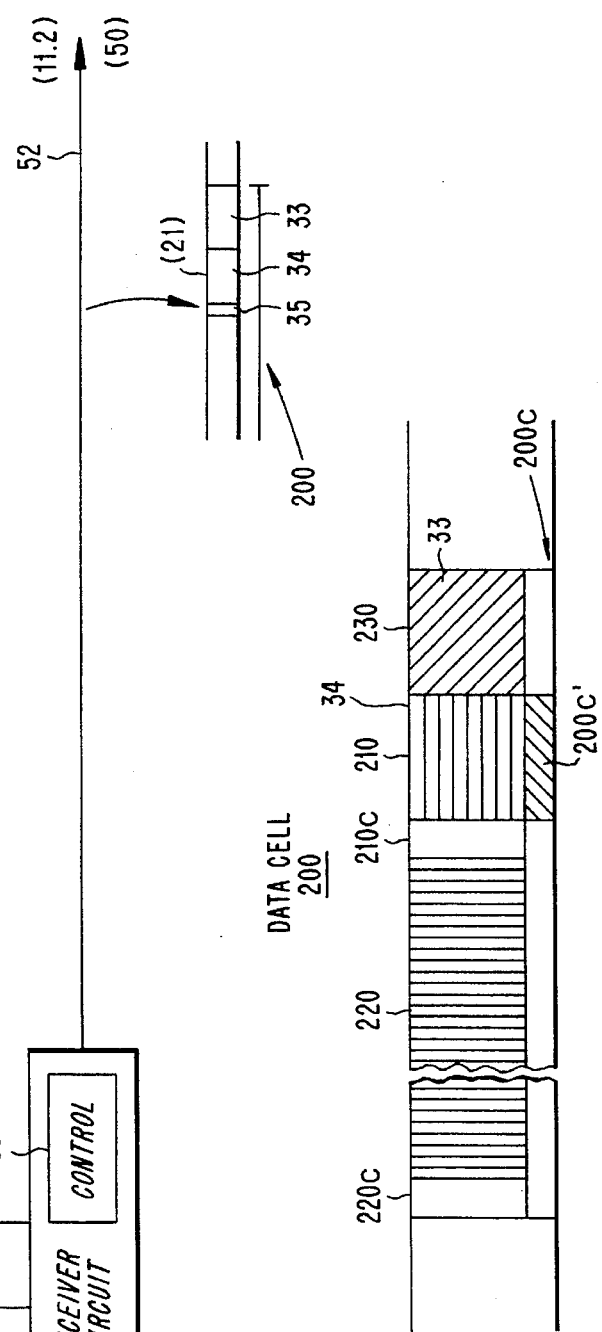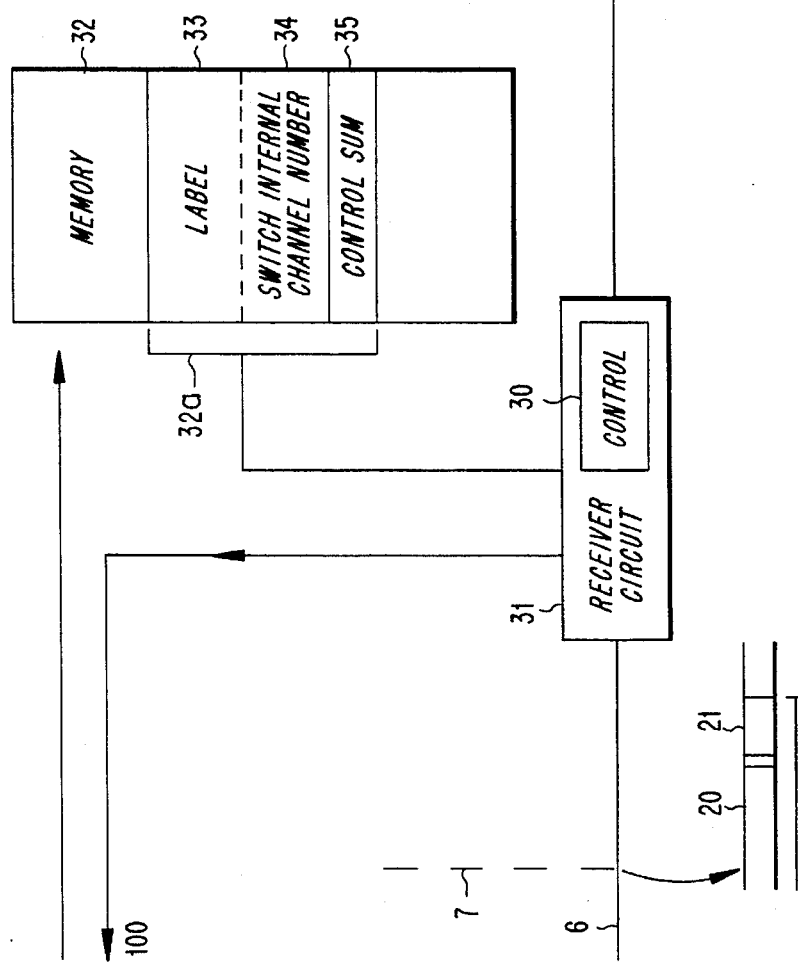

METHOD AND CIRCUIT DEVICE TO CONTROL A MEMORY

BACKGROUND

The present invention relates mainly to a method and a circuit arrangement for controlling insertion, storage, and retrieval of digital information in a memory so that not only is the digital information correctly stored but also correctly read out of the memory, before the read information, in the form of a number of coordinated bit positions, is used to control one or several functions.

The method and circuit arrangement according to the invention is more specifically intended to control retrieval of information, coordinated into data packets or data cells, from a memory so that the information read out of a memory and corresponding to a specific address is correct.

This application claims priority from Swedish patent application Serial No. 94 01318-2 filed on Apr. 19, 1994, which is incorporated here by reference.

Telecommunication systems that use data packets for required exchange of signals are previously known in various designs. For the required exchange of signals, one such system uses a number of bit positions, coordinated into structured sets of bits, that in turn are structured and coordinated into data packets. Within a known ATM-system such structured data packets are called "data cells", but in the following, the term "data packets" will be used more generally.

Data packets (data cells) of this kind, especially standardized data packets, are characterized such that certain bit positions are coordinated into sets of bits representing an addressing or address-related field (designated "Header") and including, among other things, a virtual address, also called channel number. Other bit positions are structured into a set of bits representing a user-related-information-carrying or information-content-related field (designated "Payload") and including data information from the user.

It is also previously known that, in order to realize certain hardware functions within a switching unit in an optimal way, only switch internally usable data packets or data cells are used. In addition to bit positions and sets of bits in a standardized data packet, further bit positions structured as a "label" are used. Label fields or label-related bit positions and sets of bits can be added to an incoming data packet, and the label field is used within the switching unit in order to direct the data packet to an out going link with the guidance of the bit positions and their digital values.

It is also previously known to use various kinds of memories within a telecommunication system and switching unit. Memories that store the digital information during a relatively short time are often designated buffer memories.

For a person skilled in the art, it is obvious that there is a great need for buffer memories and queue management of data packets with various bit positions and structures. A first flow of digital information, in the form of data packets, varies and has a mean flow rate somewhat lower than a second flow of digital information, meaning that a flow of information in to a buffer memory can, over short periods of time, be higher or lower than a corresponding flow out of the same memory. The mean flow into the memory is selected to be somewhat lower than the mean flow out of the memory.

There are also previously known various methods and devices used to ensure that digital information inserted into and stored within a memory is correctly readable out of the memory. A very well known method for this purpose is to let the digital information include bit positions, structured with a selected number of information-carrying bit positions, a selected number of address-carrying bit positions and/or a selected number of control-sum-carrying bit positions. The control-sum-carrying bit positions represent a selected evaluation of the selected number of information-carrying bit positions, through, for instance, a calculation or evaluation of parity bits or a "check sum" formed through a selected polynomial. The control-sum-carrying bit positions carry a "control sum", representing either formed parity bits or a calculated check sum, regardless of the selected control method.

A parity control and a device for a chip-related memory are previously known through the European patent publication EP A2 0 449 052 which describes a parity control of address signals. The parity is controlled before a digitized word is stored within a memory. An integrated circuit with an input register to receive a number of addressing bits, a set of memories to store information in a number of addressable storage positions, a control unit to evaluate at least one of the addressable storage positions corresponding to the address bits and a unit to control the parity of the address bits. A memory circuit controls parity control before a digitized word is stored in the memory circuit.

European patent publication EP A10 554 964 illustrates a storage and transfer circuit and a method to maintain the integrity of the data during a storage sequence. A calculation of a first partial control sum from a selected data field within a frame and a unit for storage of the control sum is described. A unit is oriented in a parallel relation to a series generating device, in order to evaluate a second partial control sum comprising only the data field. A unit compares the first and second partial control sum, and units that can be activated at a comparison change the new calculated control-sum as soon as the two partial control sums are not identical, before a series conversion is completed.

The construction of an ATM-cell, with cyclic redundancy check (CRC) bits at the end of the cell, is described in the European patent publication EP A1 0 531 599. Such ATM-cells can be used advantageously in accordance with the present invention. The European patent publication EP A1 0 545 575 also presents a data packet with an ending error controlling field.

A memory system in which it is possible to evaluate a data error is shown and described in the European patent publication EP A2 0 084 460. Addressing errors are discovered by forming parity information over the address and inserting it into control fields belonging to every memory position. A signal, indicating the present status of the function in the memory module, is generated in every memory module and transferred to a data processing system to be compared with a status of a signal indicating function in order to ensure that the memory module and the memory control in the process receive the same order.

U.S. Pat. No. 4,872,172 shows a circuit where a data bus transfers a data word. The data word includes eight bits with data information and one parity bit and is stored within a buffer memory temporarily before it is transferred on to be processed in a logical circuit. Every data word (data and parity bit) that is stored in the buffer register is processed in a parity calculating circuit. A parity control circuit generates a signal representing a parity error if the parity following the data is not correct. The data word and the parity bit, that have been transferred to an outgoing bus, are transferred back to another parity controlling circuit which generates an error signal for the bus when a parity error is discovered.

IBM Technical Disclosure Bulletin, vol. 24, no. 1B, p. 794 (June 1981), describes a method of ensuring that information stored within a memory is correctly readable. A parity bit, belonging to a data byte, is generated for every data byte or word comprising a number of bit positions. The value of a parity bit is determined by the number of bits with the value "1" in both the data word and the addressing value in the address register of the memory. A further parity bit is generated at the readout of the data word from the memory, and this is calculated taking the number of 1-bit positions or the number of 1-bits in both the data word and the address initiating the readout into consideration. This further parity bit is thereafter compared with the previously stored parity bit and an error signal is generated if there is a difference.

U.S. Pat. No. 4,809,278 describes a system for ensuring that information stored in a memory is correctly readable. Parity bits are generated for every word that is stored in an addressed position. The number of parity bits can be selected to be the same as the number of input connections of each storage chip used in the storage structure. A first and a second set of Exclusive-Or gates generate a first and second set of parity data for every read-write cycle addressing the same memory position. A help-memory for parity bits receives the first set of parity data for storage in positions corresponding to similar positions in each memory chip so that the same address data will read the first set of bits of parity data corresponding to each address in the structured memory. These parity data are the input signals to a second set of Exclusive-Or gates intended to form a second set.

U.S. Pat. No. 4,692,893 shows and describes a data buffer circuit that is addressable for reading and writing by using an address with n bit positions and with an addressable read register and an addressable write register, both presenting n+1 bit positions. The extra bit position is used as a parity control. The n+1-th bit in the counters for reading and writing, respectively, is used to ensure that the respective counters are positioned at "the same turn".

European patent publication EP A1 463 210 describes a circuit intended to control the storage in and addressing of a memory. At least one write address register and at least one read address register are used. Every one of the check bits of the data word is Exclusive-Or-related with a bit in the address position. The check bits are Exclusive-Or-related with the bits of the address position once again at the readout of the word in order to regenerate their original values, so that the parity of the data word can be controlled.

SUMMARY

Considering the prior art, as described above, there is a need for a method and a circuit device to ensure that digital information that is inserted into and stored within a memory is correctly read out of the memory, before the read information, in the form of a number of coordinated bit positions, is used to control one or several functions. The digital information inserted into the memory should comprise bit positions, structured with a number of information-carrying bit positions. A first number of control-sum-carrying bit positions should be calculated from the bit positions of the digital information coming into the memory and their value ("1" or "O") according to a selected evaluation. The bit positions of the digital information should be stored in an address within a main memory, as are the first control-sum-carrying bit positions, while both the first control-sum-carrying bit positions and the address of the main memory are stored in an address within a control memory.

There is also a need for a method and a circuit device that can evaluate, in a reliable way, if information (data packet) read out of a main memory is correct or not, regardless of whether the information comprises control-sum-carrying bit positions or not. When the bit positions of the digital information, stored in the address in the main memory, are read out, a second number of control-sum-carrying bit positions should be calculated, according to the selected evaluation, so that the bit positions of the read information, and their values, are accepted as correct if a following comparison between the first, stored in the control memory, and second, formed by the read information from the main memory, control-sum-carrying bit positions shows that they are identical.

Still further, there is a need to perform a corresponding selected evaluation of the information-carrying bit positions at the readout of information from the main memory to form a selected number of second control-sum-carrying bit positions. The first control-sum-carrying bit positions, stored in the control memory, should be compared with the second control-sum-carrying bit positions, thus calculated, in order to accept the read information as correct if there is an agreement, even if other means are connected indicating a lack of agreement. Read information should be acceptable as correct in spite of indications to the contrary. The selected evaluation should either comprise a parity check or a checksum formed from a selected polynomial with a greater probability of a correct evaluation in the later application.

A control memory should comprise a first-in, first-out (FIFO) memory, or a number of coordinated FIFO memories, of a previously known construction and/or function. Preferably, larger memories, such as parallel connected FIFO memories or other sets of memories, should be useable. Means that are given to, or preceding, the memory should classify information intended to be inserted into one of several available categories. The bit positions of the digital information and their values should represent a classification of the information within the data packet.

An available address position in the main memory should be evaluated through the means given to, or preceding, the main memory. The main memory and the control memory should have the same construction. The position of a data packet, or a part thereof, in the main memory and the position of a control-sum, belonging to the data packet, and the address in the main memory in the control memory, should be the same and/or readable simultaneously.

A control memory should comprise a register or a FIFO memory in which selected information regarding respective digital information, structured into a data packet or a data cell, can be stored. The selected information should comprise at least the first control-sum-carrying positions and/or the address of the data packet and/or position in the memory. Information regarding the classification and/or order of priority within a selected category of respective data packet should be stored in the register or control memory. Information or a data packet, within a certain category, should be read out in turn (FIFO) through an adapted readout circuit.

The present invention provides a method and a circuit to satisfy the aforementioned needs by ensuring that digital information that is inserted into and stored within a memory is correctly read out of the memory, before the read information, in the form of a number of coordinated bit positions, is used to control one or several functions. Digital information, inserted into the memory, comprises selected bit positions and their digital values, "0" or "1". Means are arranged to give received information, intended to be inserted into the memory, an address belonging to the memory.

The method and circuit device according to the present invention perform a calculation of a first set of control-sum-carrying bit positions from the bit positions of the digital information coming into the memory and their values according to a selected evaluation. At least the bit positions of the digital information and the first control-sum-carrying bit positions are stored in an address within the main memory. The first control-sum-carrying bit positions together with the selected address within the main memory are stored in an address within a control memory. When the bit positions of the digital information, stored in the address in the main memory, are read out by pointing out a selected address in the control memory and reading the stored digital information within the address pointed out in the control memory, a second set of control-sum-carrying bit positions is calculated, based on the read information in the main memory, according to the selected evaluation. The bit positions of the read information and their values are accepted as correct if a following comparison between the first control-sum-carrying bit positions, read out of the control memory, and the second calculated control-sum-carrying bit positions shows that they are identical.

According to the present invention, digital information inserted into the memory comprises a selected number of bit positions, preferably a data packet or a data cell. The number of bit positions are divided and structured into a selected number of information-carrying bit positions, a selected number of address-carrying bit positions, and a selected number of control-sum-carrying bit positions. The number of bit positions within the various categories are preferably variable. Bit-position-related information that is read out is used to influence and control various switch internal functions. The functions are activated and carried out by a computer used for these purposes. Control-sum-carrying bit positions are used to represent a selected evaluation of the information-carrying bit positions.

The present invention also provides a corresponding selected evaluation of the information-carrying bit positions performed at the readout of information from the main memory to form a selected number of second control-sum-carrying bit positions in order to form a second control-sum. The first control-sum-carrying bit positions and their values are compared with the second control-sum-carrying bit positions and their values. The read information is, in principle, accepted as correct if there is an agreement.

According to the present invention, the selected evaluation of the selected information-carrying bit positions and the control-sum comprises a parity check or, as an alternative, a check-sum formed from a selected polynomial.

The present invention further provides that the main memory can be a freely addressable memory, and the control memory can be a FIFO memory or be given the function of a number of coordinated FIFO memories.

According to the present invention, means belonging to or preceding the main memory are arranged to give received information, intended to be inserted into the memory, an address belonging to the memory or to evaluate an addressable memory position or positions. These means are able to classify information intended to be inserted into one of several available categories. The bit positions of the digital information and their values can represent a classification of the information.

The present invention further provides a control memory comprising a register in which selected information regarding respective data packet, such as the first control-sum-carrying bit positions and the address of the data packet and/or position in the main memory, is stored. Information regarding the classification of respective data packet is also stored in the control memory. Information or a data packet, within a certain category, is read out in turn through a readout circuit. If there is an agreement between the first, read from the control memory, and second, calculated, control-sum-carrying bit positions, but there is a lack of agreement between further bit positions, belonging to the data packet, the read information or data packet is still accepted as correct.

Within a telecommunication system and switching unit, according to the present invention, required exchange of information is carried out by coordinating information-carrying digital signals into standardized data packets or data cells, with one addressing or address-related field and one information-carrying or information-content-related field or sets of bits.

In the following description both bit positions within the address-related field and the information-related field are referred to as "information-carrying" bit positions, even though within these fields there are control-sum-carrying bit positions that can be used by the invention.

BRIEF DESCRIPTION OF THE DRAWINGS

Preferred embodiments of a circuit device and a method in accordance with the present invention will now be described in more detail and in a few variations with reference to the accompanying drawings, in which:

FIG. 1 illustrates a strongly simplified telecommunication system, using ATM-technology;

FIG. 2 illustrates a standardized data cell, used in the exchange of signals between a caller and a switching unit;

FIG. 3 illustrates a strongly schematic receiver circuit for an incoming, caller-related and standardized data cell which is to be transformed into a switch internally used data cell with a supplementary label;

FIG. 4 illustrates more specifically such a label-supplemented data cell;

DETAILED DESCRIPTION

Figure 5:
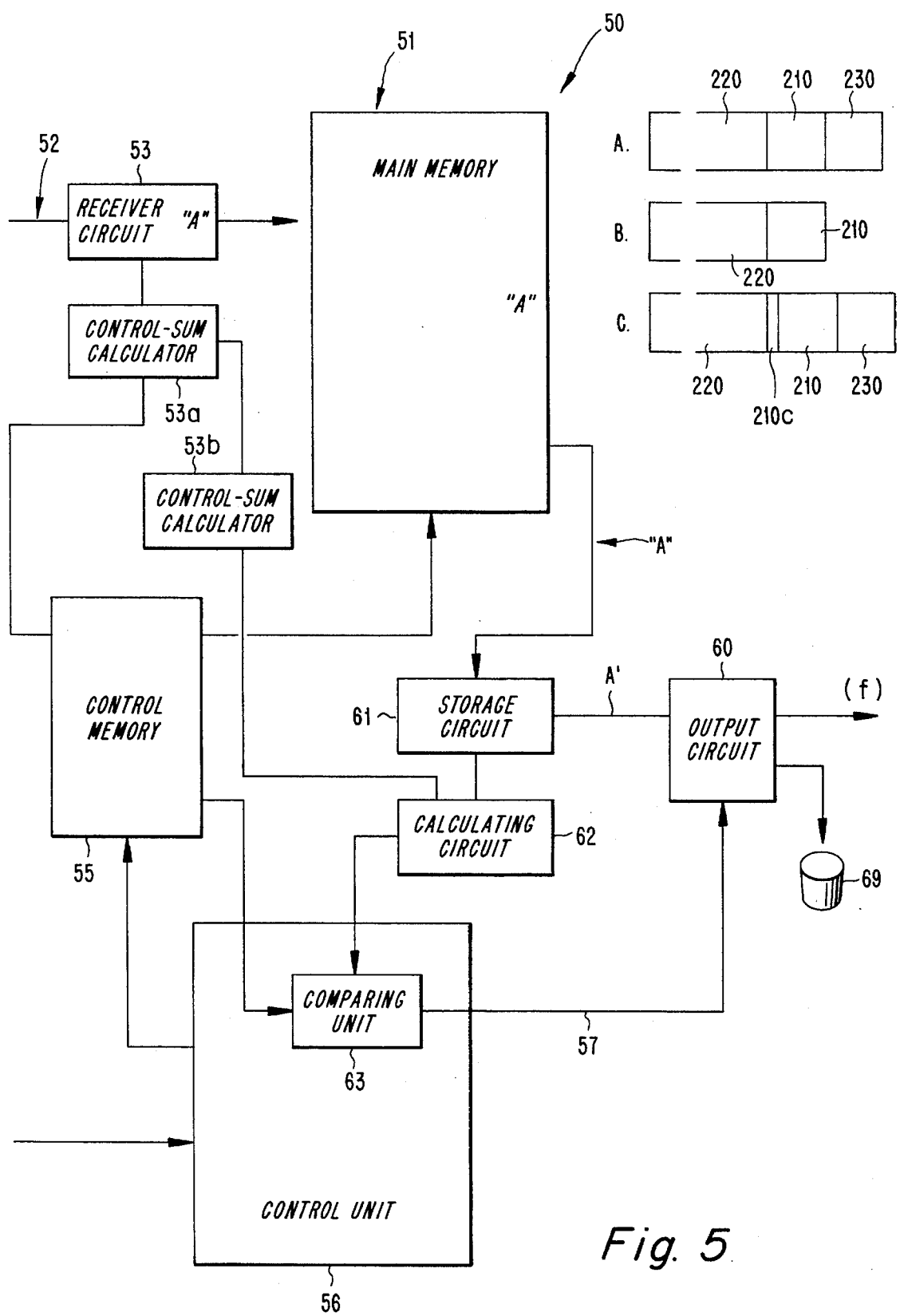
FIG. 5 illustrates a first embodiment of a circuit device according to the present invention, strongly simplified and in block schematic.

A strongly simplified telecommunication system, known as an ATM-system, is illustrated with reference to FIG. 1. The telecommunication system uses, for its function and exchange of signals, data with information-carrying bit positions (the positions of the bits in a bit matrix and the logical value, "O" or "1", of the bit) which are as sets of bits, coordinated into data packets or "data cells". For a person skilled in the art, it is obvious that the exchange of signals can be performed in both directions but the following description will, for the purpose of simplicity, only illustrate the connection and exchange of signals between a transmitter 3, belonging to a transmitting terminal 1, and a receiver 3a, belonging to a receiving terminal 2.

The exchange of signals between the terminals 1 and 2 is carried out through data cells, structured regarding their bit positions, the logical value of the individual bits, and the selected coordination into sets of bits, in order to agree with a standardized protocol valid for the ATM-system.

The transmitter 3 coacts, through a line or connection 4, with a line-related receiver unit 5 which is, through a line or connection 6, connected to an input circuit 7. The input circuit 7 is, in turn, through a line or connection 8, in coaction with a number of connecting terminals 9, belonging to an ATM-selector 10. The ATM-selector 10 is equipped with two redundant connecting planes or connecting cores 11, 12 which, through circuits not illustrated, coact with the signal receiving unit 3a and the terminal 2. The lines 4, 6 and 8 can be made out of one or several physical connections or conductors.

For every ATM-selector 10, required exchange of signals and information is performed through a number of bit positions. A number of such bit positions are structured into field or sets of bits in order to form data cells.

The signalling system, according to FIG. 1. requires a number of previously known devices and functions, not illustrated in FIG. 1, in order to function, but these will not be mentioned further since they do not influence the function, or the full understanding, of the present invention. It will, nevertheless, be mentioned that the switch unit 10 comprises a control computer 100. The construction and functions of the control computer 100 are very complex, and the following description is intended to only describe parts and functions that are directly relevant for the understanding of the present invention.

FIG. 2 illustrates such a standardized data cell 20, that can be made out of a five-byte (eight bit word) section or field 21 (Header) comprising address-informing or carrying sets of bits, and a 48-byte (eight bit word) section or field 22 (Payload) comprising information-carrying sets of bits. Other information can also be coordinated into such a data cell 20. FIG. 2 is intended to further illustrate that data cells 20', 20, and 20" appear on conductor 4 in a sequential or serial manner with a preceding information-carrying field 22' of the data cell 20' immediately followed by the address-information-carrying field 21 and the information-carrying field or part 22 of the following data cell 20, and so on.

A receiver circuit 31, belonging to a switch unit within a telecommunication system, is illustrated in FIG. 3 with a receiver or control circuit 30 which can be included in the input circuit 7 or circuit 9. Several such circuits can be available. The receiver 31, intended to receive data cells appearing sequentially, comprises or coacts with the control circuit 30 which here can be regarded as a part of the input terminal of the unit 7.

Transmitted data cells will, in a standardized way, comprise all information regarding a requested connection, whenever the calling unit 1 initiates a call to the called unit 2, and such data cells or packets will here be designated as a first category (calling category). Every such call is given one of several available, switch internally usable channel numbers, through switch internal equipments, including the control computer 100. The control computer 100 notifies and gives, simultaneously, the caller 1 a channel number that is to be valid during the following exchange of signals with the called unit 2. (The case can also be that the calling unit 1 specifies what channel number is to be used in the following exchange of signals.)

The control computer 100 notifies the receiver or control circuit 30 of the channel number that presently is valid for the calling unit 1 and an address information to the position or positions within a memory 32, wherein required information and a selection of an internal channel number is stored, that corresponds with this channel number.

Known circuits within the control computer 100 are used in a previously known manner in order to select, point out and engage an available channel through the switch unit 10, with guidance of the information content of the data cell of a first category. These circuits will, in this exemplifying embodiment, be illustrated as circuits adapted to evaluate, point out and engage a switch internal channel, taking the information in the address-related field 21, the information within the information-related field 22 of the data cell 20 of a first category, and the momentary load and number of engaged channels within the switch unit under consideration, and designate this channel a specific channel number.

The control memory 32 is formed so that every selected internal channel number, intended to establish a connection through the switch unit, corresponds to a specific address position.

The control computer is arranged so that it is able to take fields, or sets of bits of bit positions, and insert them into and store them within the addressed position of the memory 32 corresponding to the selected internal channel number for every call and connectable connection. One field of bit positions corresponds to the selected channel number through the switch unit, one field of bit positions corresponds to switch internal functions, and one field of bit positions corresponds to a specifically calculated controlsum, such as parity bits or a check sum, calculated according to a selected algorithm or polynomial.

The receiving circuit 31, receiving data cells 20 from the caller 1, evaluates continuously, among other things, the bit positions within the address-related set of bits in the data cell. Circuits are activated to transmit the complete data cell to the control computer 100 at a specifically selected channel number (the channel number of a call) since this channel number refers to a call.

An available connection is evaluated, when the control computer 100 receives such a call, which is given a switch internal channel number. Usually the control computer 100 transmits a message to the caller 1 with the notification that a new channel number is to be used for the desired connection and the following signal exchange, wherefore succeeding data cells are to comprise the new channel number. The new channel number, given to the caller 1, is supplied to the receiver circuits 31 together with an information regarding the internal channel number.

Whenever data cells with the new channel number, selected by the control computer 100, are received by one of the receiver circuits 31, intended to receive data cells, there is an available table within these circuits which indicates the corresponding address position in the control memory 32. The data cells 20 coming in to the receiving circuit 31, with the new channel number 21, can thus be used to point out the right address or position 32a in the control memory 32, where the switch internal information 33, 34, specific for the switch internal selected connection or connecting way, is stored and is to be given to the data cell 20. A label field 33, comprising the information sorted in under the address 32a that has earlier been created and stored into the control memory 32 by the control computer 100, is added to the data packet 20 and/or the switch internal channel number 34, to replace the old channel number 21 of the data cell 20.

With reference to FIG. 4, the data cell 200 includes a label field 230 (33), an address-related field 210 (34), a field 210c of control-sum-carrying bit positions, such as for a parity control or a check sum, formed through a selected polynomial for the bit positions within the label field 230 and/or the address-related field 210. There is also an information-carrying field 220 and a field 220c representing a set of control-sum-carrying bits, in the form of a parity control or a check sum, formed through a selected polynomial. The field 220c can comprise a control-sum valid for the complete data cell 200. The number of bit positions within the field 220 is normally significantly larger then the number of bit positions within the fields 210 and 230. The control-sum field 210c can comprise only the label field 230, and the control-sum field 220c can comprise only the Payload field 220.

Depending on various requirements, one or several control-sum fields or no control-sum field at all can be used. To simplify the following description, only the control-sum field 220c will be described, though, according to FIG. 6–8, the control-sum field 210c or the control-sum field 220c and the formed set of bits within the control-sum field 220c provides a control-sum valid for the remaining complete data cell.

The structuring of the data cell, according to FIG. 4, illustrates further that every bit position (their position and their digital or logical value) within the fields 230, 210, 210c, 220 and 220c are controlled with byte-related parity bits 200c. Selected parity bits 200c', valid for the address-related field 210, are selected to have odd parity while the rest are selected to have even parity. Other parity distributions can also be selected.

From the following description it will be shown that both the control-sum 220c and the parity bits 200c can be used in order to establish and evaluate whether read information is correct or not, and the choice depends on the application at hand. There is a great need of buffer circuits or likewise for the storage of data cells within telecommunication installations. Various types of coordinated sets of bits structured in various ways, such as data cells, can be controlled according to the present invention. The embodiment according to FIG. 5 is intended to illustrate one possibility to establish that a read data cell is correct and in agreement with a stored data cell, without the need of the data cell itself to carry a control sum. For the other embodiments, according to FIG. 6 to 8 it is, in the interest of simplicity, supposed that data cells, with a label field and set of control-sum, appear on conductor 52 in FIG. 3 and that these, one by one, are to be stored in a buffer circuit or circuit device 50.

With reference to FIG. 5, a circuit device 50 is illustrated in block schematic, constructed according to the present invention. The circuit device 50 is adapted to ensure that digital information inserted into and stored within a main memory 51 is correctly read out of the memory. Received information, intended to be inserted into the memory, appears on one of several available conductors 52. The embodiment according to FIG. 5 can provide a storage of every kind of structured set of bits.

FIG. 5 illustrates a set of bits "A" with a label field 230, an address field 210 and an information-carrying field 220 without, or at least without using, control-sum-related sets of bits. One set of bits "B" comprises only an information-related or an information-carrying field 220 and an address-related field 210. One set of bits "C" is intended to illustrate the insertion of a control-sum-related set of bits 210c, which is practically not required in this embodiment.

Figure 6:
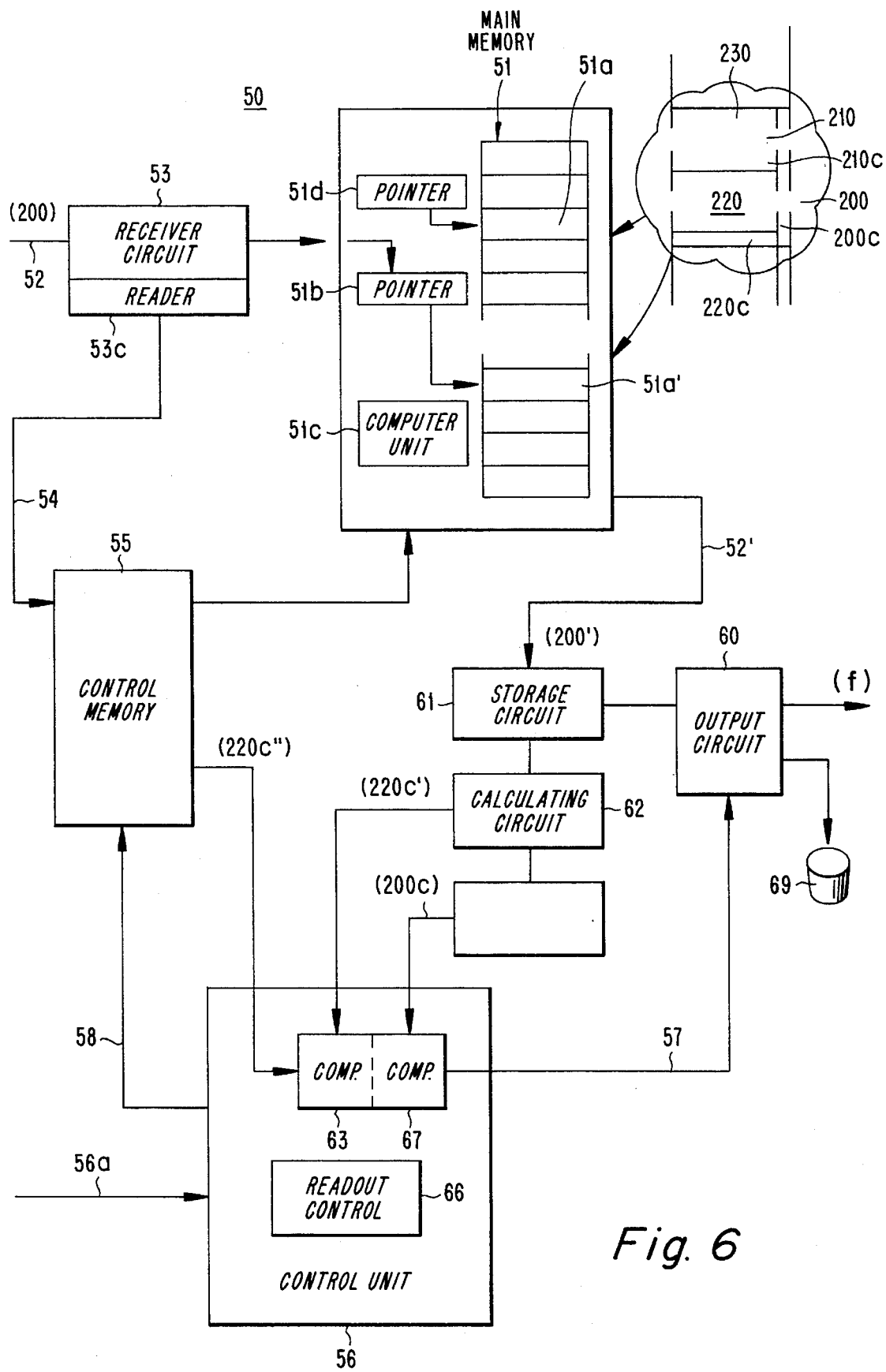
FIG. 6 illustrates a second embodiment of a circuit device according to the present invention, strongly simplified and in block schematic.
Figure 7:
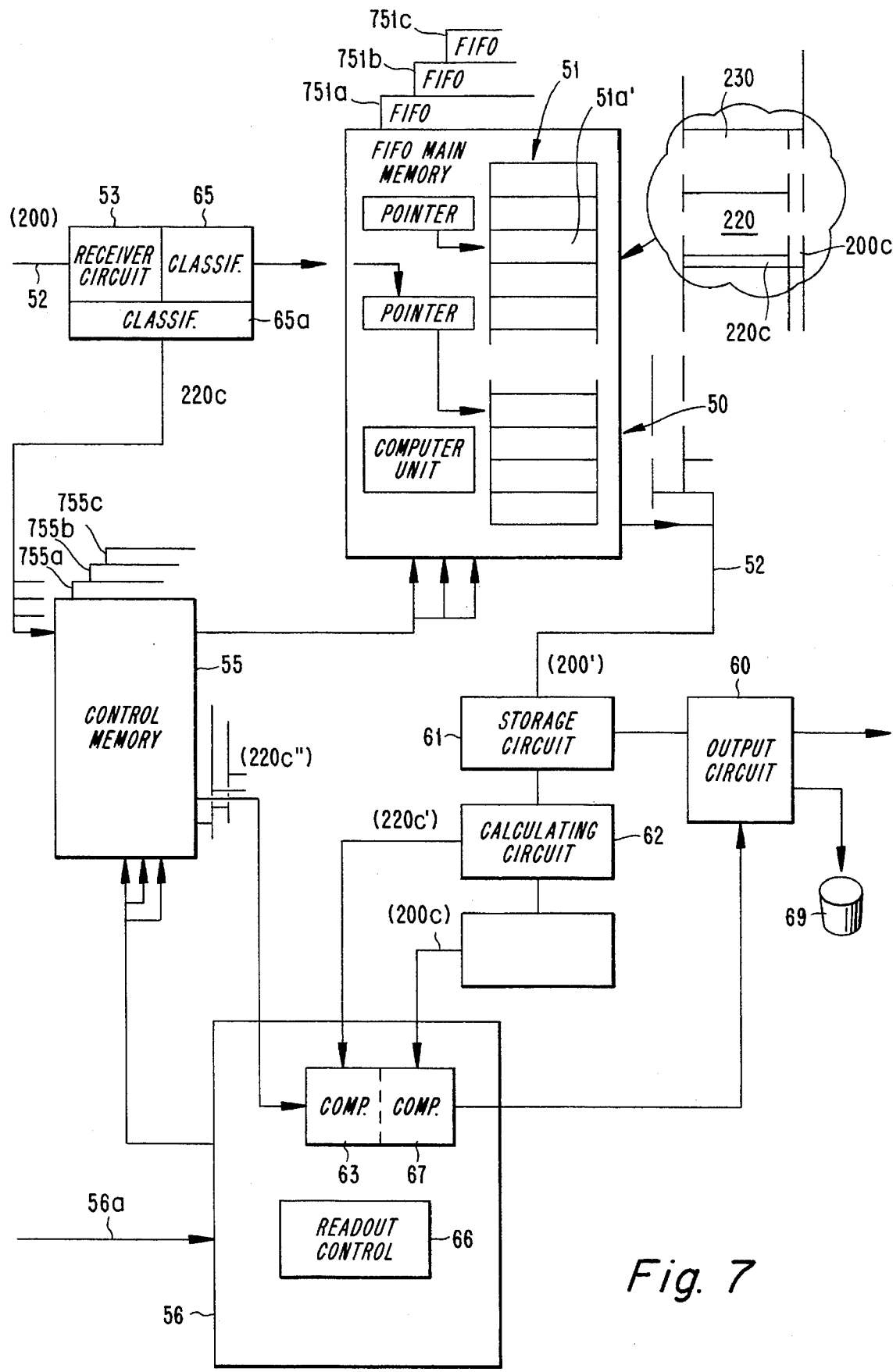
FIG. 7 illustrates a third embodiment of a circuit device, a classifying circuit device, according to the present invention, strongly simplified and in block schematic.
Figure 8:
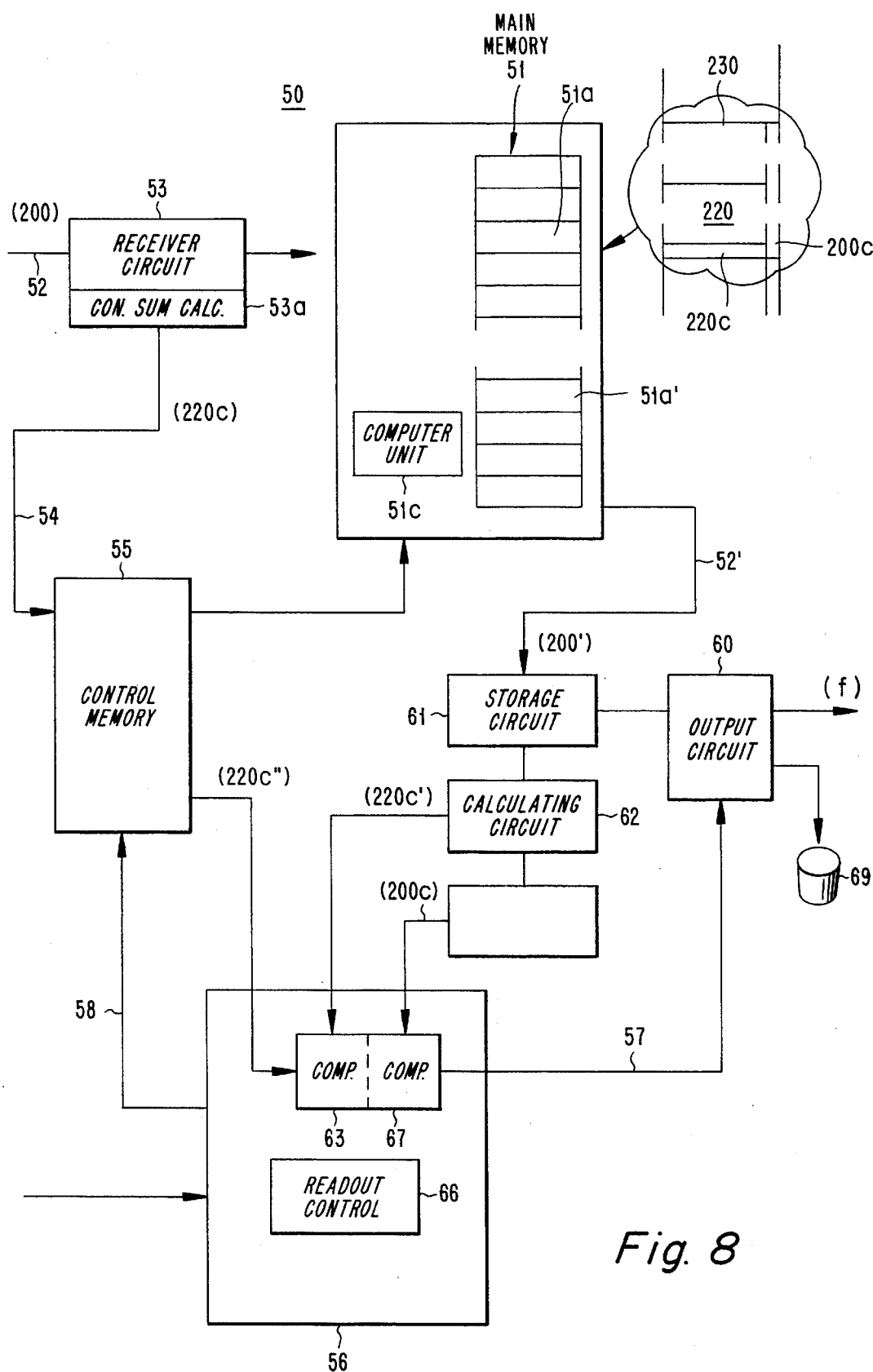
FIG. 8 illustrates, a fourth embodiment of a circuit device, a classifying circuit device, according to the present invention, strongly simplified and in block schematic.

FIG. 5, and also remaining FIGS. 6–8, present a receiver circuit 53, a main memory 51, a control memory 55, a storage circuit 61, a calculating circuit (f(x)) 62, a control unit 56, a comparing unit 63, and an output circuit 60 for controlled data packets or data cells that are found to be correct. According to FIG. 5, a control-sum is calculated in a unit 53a at the reception of a structured set of bits, according to the embodiments "A–C" or any other form. The control-sum is calculated according to the complete set of bits or parts thereof with a parity control or calculation through a selected polynomial. The choice of calculating method can be done in a calculating initiating unit 53b.

The calculated control-sum is stored in the control memory 55 in a storage position that corresponds to the storage position of the selected structured set of bits, say "A", in the memory 51. At the readout of the stored set of bits "A" from the main memory 51 to the storage circuit 61, the bits are transferred to a calculating circuit 62 which calculates a control-sum in the same way, through the unit 53b. The previously calculated control-sum, stored in the control memory 55 is read at the same time. The read set of bits "A" is transmitted to an output circuit 60 if a comparison between these two control-sums, in a comparing circuit 63, provides an agreement. The data cell is disposed of when there is no agreement 69.

The first embodiment illustrated in FIG. 5 uses data packets "A" with only information-carrying bit positions (230, 210 and 220) and without control-sum-carrying bit positions (200c, 200c' and 210c according to FIG. 4). This embodiment can also be used with the illustrated embodiments in FIG. 7 and 8.

A second embodiment according to FIG. 6 uses data packets or data cells with control-sum-carrying bit positions, according to a previously described embodiment with reference to FIG. 4. In the second embodiment, bit positions and their logical values of a data cell are to be controlled before data cell or information 200', in the form of a set of coordinated bit positions, read from the main memory 51, is used to control one or several functions (f) that can be activated by a computer unit, such as the computer unit 100.

According to the second embodiment, the digital information 200, inserted into the main memory 51, is structured with a selected number of information-carrying bit positions, illustrated according to the embodiment in FIG. 4 as the bit positions within the fields 230, 210, 210c, 220, and a number of first control-sum-carrying bit positions within the field 220c. The selected number of first control-sum-carrying bit positions 220c represents a selected evaluation of the preceding information-carrying bit positions and comprises parity bits or a check sum generated by a selected polynomial.

Means 51b within the memory 51, or means 53 preceding the main memory 51, controllable by a computer unit 51c, are adapted to give an address belonging to a memory to received information 200, intended to be inserted into the main memory 51. This address in the memory 51 is, in the exemplifying embodiment, illustrated with the designation 51a' and the field 220c. The field 220 and remaining fields within the data cell 200 are illustrated at the memory position 51a'. The field 200c is also inserted into the memory 51 in the memory position 51a'.

The memory 51 is made out of a FIFO memory with a pointer or counter 51b intended to point out an available address position 51a' which is the address position that is intended for the next data cell to be stored. The FIFO memory 51 is also equipped with a further pointer or counter 51d, intended to point out the address position of the data-cell-related bit positions 200' that stands in turn to be fed out of the memory 51 at an activating signal on conductor 56a. The address positions between these two pointers are now available to receive further data-cell-related and coordinated bit positions.

A control memory 55 is more or less identical to the FIFO memory 51, and the momentary positions of the two pointers within the main memory 51 correspond to the momentary positions of the two pointers within the control memory 55. These are running synchronously, always pointing at the same address positions within respective memory. The construction of the control memory 55 is not illustrated since it can be regarded as identical with the construction of memory 51 and is previously known. Whenever data cells (200) include bit positions representing a control-sum (for instance 220c), such a control-sum can be read by a unit 53c. It can be that only the read control-sum (220c) is stored within the control memory 55 as all the bit positions of the data cell are stored within the main memory 51.

Such an embodiment will now be described in more detail. The first control-sum-carrying bit positions 220c are, through the circuit 53c, read from the bit positions, and their values, of the digital information 200 coming to the main memory 51. The bit positions of the digital information 200 are stored at an address within the main memory 51. Only the first control-sum-carrying bit positions 220c are stored at a corresponding address within a control memory 55.

Second control-sum-carrying bit positions 220c' are calculated in a calculating unit 62 according to the evaluation of the first control-sum-carrying bit positions 220c at a readout of the bit position of the digital information stored at the address in the main memory 51. The first bit positions 220c'' coming from the previously calculated first bit positions 220c, stored in the memory 55, are, at the same time, read. The bit positions, and their values, of the read information 200' are accepted as correct if a following comparison between the first 220c'' and second 220c' control-sum-carrying bit positions shows that they are identical.

In a second embodiment, with data cells comprising control-sum-carrying bit positions according to FIG. 4, the unit 53c can be arranged to read the control-sum-carrying bit positions 220c and/or the bit positions 200c, or alternatively only the bit positions 200c or the bit positions 200c'. An incoming data cell 200 will thus be completely stored in a last memory position 51a'. At the same time control-sum-carrying bit positions, such as a check sum, that have been pointed out and read, are stored only in the register 55 at a corresponding address position. As the pointer in the memory 51 is moved, the pointer in the memory or register 55 is moved in the same way in order to keep the positions corresponding to each other.

The embodiment according to FIG. 6 is intended to illustrate a position where the complete data cell 200 is read out 200' of the memory 51 from the position 51a and stored in the storage circuit 61 at the same time a corresponding check sum 220c'' is read out of the corresponding address position in the register 55. An address position in the control memory 55 is activated, and the control unit 56 will receive information regarding the value of the control-sum-carrying bit positions 220c', according to a selected calculation in the unit 62. A control-sum 220c'' is stored in the register 55 when a control unit 56, through a unit 66 and a conductor 58, requires a readout of a data cell from the main memory 51.

It is thus possible to, within a third unit 63, compare the first control-sum-carrying bit positions 220c'', stored in the control memory 55, with the calculated second control-sum-carrying bit positions 220c' and, within the unit 63, decide whether there is an agreement between these bit positions. If there is an agreement read information 200' can be accepted as correct, and the information or data cell can be transferred through a conductor 57 and a unit 60 to control a function (f) in the switch unit.

The selected evaluation within the unit 62 and the forming of the control-sum-carrying bit positions 220c' in this unit 62 are performed by a parity control, or alternatively, through a check sum formed out of a selected polynomial, such as the polynomial $x^{10}+x^9+x^6+x^5+x+1$. The control-sum-carrying bit positions 220c can detect single, double, and triple faults with such a polynomial. The main memory 51 and the control memory 55 can preferably, in their simplest form according to FIG. 6, be made out of one single FIFO memory.

The embodiment described with reference to FIG. 7 can be regarded as a development of the embodiment according to FIG. 6. FIG. 7 is intended to illustrate a number of FIFO memories serving as main memories 51, 751a, 751b, 751c oriented in "parallel" to each other, each intended to store data cells of one and the same category. A corresponding number of registers or control memories 55, 755a, 755b, 755c are for these purposes required, each given its own category. The main memory 51 corresponds to the register or control memory 55, the memory 751a corresponds to the register 755a and so forth, whereby corresponding memories and registers are stepped synchronously, always pointing at the same address position.

The embodiment illustrated in FIG. 7 of the main memory 51, 751c requires that the means 53, preceding the memory 51, comprises a unit 65, 65a that classifies information or a data cell, intended to be inserted, by evaluating the content in the label field 230 (or other fields), into one of several available categories. The initiation of a readout from a pointed out memory, for instance memory 751b, is done at the same time as an initiation of a readout from a pointed out register or control memory, for instance register 755b, in a previously known way.

The embodiment according to FIG. 7 provides a memory 51 (51, 751a, 751b, 751c), where data cells of one category are coordinated into one FIFO memory 51 and register 55 while data cells of another category are coordinated into another FIFO memory 751a and register 755a, and so forth, so that there is a risk of a poorly used memory capacity, since a selected category only can be stored in the memory previously selected.

An embodiment according to FIG. 8 is illustrated in order to get a better used memory capacity and in order to be able to store data cells of the same or different categories more efficiently. The embodiment according to FIG. 8 requires a main memory 51 of a more complex nature since the position of a respective data cell is unanimously determined, and a data cell can be given any available position. The main memory 51 and register 55 can be "virtual" FIFO memories or buffer circuits. In this case, selected information intended for each data cell, such as the first control-sum-carrying bit positions 220c and the selected address 51a and/or position of the data packet, is stored in a register 55 serving as a control memory. The register is, besides this, able to store information regarding the category of a respective data packet.

A readout of information or a data packet from the main memory 51 is initiated through a readout circuit, within a sixth unit 66, connected with the control unit 56 through the register 55. Such data packets are read in turn within a given category. It is supposed that a data cell of a first category is to be selected and read out through the control unit 56. The current data packet, sorted into priority order, is thereby evaluated in the register 55 and the register can point out the relevant memory position in the memory 51. The instruction from the control unit 56 requires a determined category.

The memory 51 in FIG. 8 provides a storage of the data cell within any number of addresses, and means are therefore required to determine what address positions that are available. These available address positions are sorted into a so called "available list".

Using the data cells 200 with a parity control 200c, it is possible, even if there is no agreement between the first control-sum-carrying bit positions 220c stored in the control memory and second 220c' calculated control-sum-carrying bit positions, to accept the read information or data packet as correct if there is an agreement within a seventh unit 67 between further bit positions, such as 200c, 200c', belonging to the data packet.

An ATM-selector, according to FIG. 1, is a switch for so called data cells with a fixed length. The ATM-selector comprises a selector core (11, 12) and selector terminals (7, 9), one selector terminal for each terminal in the selector core. The selector core is doubled and comprises two planes or units 11, 12, both constantly and independently active in doing the same work. The two planes 11, 12 are redundance terminated at the selector output terminals, meaning that one of the two identical data cells of every single data cell from the two planes of the selector core is disposed of.

Since the planes of the selector core are not synchronized, and the redundance termination is performed per connection and plane, it is possible that two data cells, used at the same time, one from each respective plane, are both to be transmitted. Because of this, buffers are required at the selector terminals of the data cells arriving from the two planes of the selector core. The exemplifying embodiments according to FIG. 7 or 8 are intended to illustrate such an embodiment.

The buffering at the selector terminal has to be intelligent, i.e. has to be able to keep various queues in order, one queue for every kind of cell or data cell category. One such classification into categories is done taking the priority and type (for instance signalling cells) of the data cells into consideration. This can be implemented with one selector terminal using one single large memory 51, holding a number of buffer places, such as the one designated 51a, and managing of a pointer or a register 55 for these cell buffer places.

FIG. 4 illustrates a complete data cell 200 equipped with parity bits which advantageously can be used solely to control bit errors at the transmission of cells, in parallel form, between two adjacent hardware functions. The internal memory and the FIFO memories belonging thereto, comprising the various queues, can both be controlled for bit errors and addressing errors since the data cell 200 has the structure illustrated in FIG. 4, by using a combination of parity and the check sum of the cell in the field 220c. The parity control ensures that no bit errors have occurred in any single byte, while the field 220c is used to control various types of addressing errors in the memories, at the same time as eventual bit errors can be detected.

The selected queue receives a pointer from the "available list" and the data cell is written into the buffer place pointed out by the pointer whenever the buffer memory 51 in FIG. 8 is used to buffer a data cell. The form of the data cell is preserved at the writing and comprises sixty bytes, with the field 220c at the very end. The used pointer is written into the current queue together with the field 220c of the cell at the writing of the cell into the buffer memory.

The field 220c can, as described previously, be used to detect various addressing errors that might occur since the field constitutes a unique identification of the cell. It is known that pure addressing errors of both temporary and permanent kind can occur, because of several various reasons, in the memory areas of the FIFO memories.

The field 220c' is calculated whenever a data cell is read out of the buffer memory 51. The result from this calculation is compared with both the field 220c, which actually was a part of the cell, and with the field that was stored in the queue with the pointer within the register 55. It is assumed that the data cell is correct or correctly read out if the newly calculated field 220c' is identical with the one that already was in the data cell and that the logic has had a proper function with the least significant address bits, those used at the addressing within the data cell. If, besides this, the newly calculated field 220c' is identical with the field that is stored in the queue together with the pointer within the register 55, it is obvious that the right data cell really has been read out, meaning that the logic and the most significant address bits, those used for the addressing, have had a proper function and that the pointer really pointed out in the right way.

A parity control 200c can be used to investigate if there is a data error or an error in the register 55 if these measures would show that the newly calculated field 220c', the field 220c stored within the cell, and the field stored with the pointer in the register are not identical with each other.

The logic in the control unit 56, managing the pointers in the queues, is continuously controlled by adding the number of the pointers in the various queues, which always should amount to the total number of buffer places. Whenever the "available list" is full the other queues have to be empty. Such errors can occur, for instance, if one of the pointers in the FIFO memories "jumps" in a faulty way, which would disturb a complete queue.

It is of course within the scope of the invention to use only the parity control of the bit fields 200c and 200c'. If an embodiment is chosen where both the control-sum 220c and the parity bits 200c, 200c' are to be used and compared it is, of course, sometimes necessary to store both of these in the register 55, and to compare both of these in different units.

It is to be noted that the area 35 in the memory 32 can hold the control-sum-carrying bit positions 210c or the control-sum-carrying bit positions 220c.

The block 62a is used to store the parity bits 200c for the complete ATM-cell in order to perform a further control of the read information if there is a lack of agreement between other control-sum-carrying bit positions as previously described.

It will be understood that the invention is not restricted to the illustrated exemplifying embodiments thereof and that modifications can be made within the scope of the inventive thought illustrated in the following claims.

What is claimed is:

1. A method of ensuring that digital information inserted into and stored within a main memory is correctly read out of the main memory, before the read information, in the form of a number of coordinated bit positions, is used to control one or several functions by using a control memory, wherein the digital information, inserted into the main memory and the control memory, comprises coordinated bit positions, and means are arranged to give received information, intended to be inserted into the memory, an address belonging to the main memory, the method comprising the steps of:

calculating first control-sum-carrying bit positions and corresponding values from the bit positions and corresponding Values of the digital information intended to be stored according to a selected evaluation;

storing the bit positions of the digital information and the first calculated control-sum-carrying bit positions in a selected address within the main memory;

storing the first calculated control-sum-carrying bit positions and the selected address in the main memory in a selected address within the control memory;

reading out the bit positions of the digital information, stored in the address in the main memory, by pointing out a corresponding address in the control memory and by reading the stored digital information within an address pointed out in the main memory, corresponding to the address in the control memory;

calculating second control-sum-carrying bit positions from the information read from the main memory, according to the selected evaluation; and comparing the first calculated control-sum-carrying bit positions, read out of the control memory, with second calculated control-sum-carrying bit positions, and accepting the bit positions of the read information and their values as correct if the comparison shows that the first calculated control-sum-carrying bit positions and the second calculated control-sum-carrying bit positions are identical.

2. The method of claim 1, wherein the bit positions of the digital information, intended to be stored in the main memory, are structured as a selected number of first information-carrying bit positions and a selected number of first calculated control-sum-carrying bit positions, and the selected number of first calculated control-sum-carrying bit positions represents the selected evaluation of the selected number of first information-carrying bit positions.

3. The method according to claim 1, wherein the selected evaluation comprises a parity check.

4. The method of claim 1, wherein the selected evaluation comprises a check-sum formed from a selected polynomial.

5. The method of claim 1, wherein the main memory and the control memory are made out of the same kind of memories.

6. The method of claim 1, wherein the main memory is a freely addressable memory while the control memory comprises one or several FIFO memories.

7. The method of claim 1, wherein the means that are given to, or preceding, the main memory classifies the digital information, intended to be inserted, into one of several available categories.

8. The method of claim 7, wherein an available address position in the main memory is evaluated through the means given to, or preceding, the main memory.

9. The method of claim 1, wherein the digital information is structured into data packets or data cells.

10. The method of claim 1, wherein the bit positions and corresponding values of the digital information represent a classification of the digital information into a category.

11. The method of claim 1, wherein the control memory comprises a register in which selected information regarding a respective data packet, such as the first calculated control-sum-carrying bit positions and the address of the dam packet and/or position in the main memory, is stored, and information regarding the classification of the respective data packet is stored.

12. The method of claim 1, wherein the digital information or data packet, within a certain category, is read out in turn through a readout circuit.

13. The method of claim 1, wherein if there is an agreement between the first calculated control-sum-carrying bit positions read-out of the control memory and second calculated control-sum-carrying bit positions but a lack of agreement between other bit positions belonging to a data packet, the read information or dam packet is still accepted as correct.

14. A device for ensuring that digital information that is inserted into and stored within a memory is correctly readable out of the memory, the device comprising:

a main memory for storing digital information and the bit positions of the digital information in an address;

means, belonging to or preceding the main memory, arranged to give received information, intended to be inserted into the main memory, an address belonging to the memory;

a first calculating circuit for calculating first control-sum-carrying bit positions and corresponding values from the bit positions and corresponding values of the digital information according to a selected evaluation;

a control memory in which the calculated first control-sum-carrying bit positions and the selected address in the main memory are stored in a selected address;

a second calculating circuit for calculating second control-sum-carrying bit positions according to the selected evaluation, when the bit positions of the digital information, stored in the address in the main memory, have been read out; and a comparing circuit for comparing the calculated first and second control-sum-carrying bit positions, and accepting the bit positions of the read information, and their values, as correct if the comparison shows that the calculated first and second control-sum-carrying bit positions are identical.

15. The device of claim 14, wherein the bit positions of the digital information intended to be stored are structured as a selected number of first information-carrying bit positions and a selected number of the calculated first control-sum-carrying bit positions, and the selected number of the calculated first control-sum-carrying bit positions represents a selected evaluation of the selected number of first information-carrying bit positions.

16. The device of claim 14, wherein the selected evaluation within the first calculating circuit or unit is arranged to create a parity check.

17. The device of claim 14, wherein the selected evaluation within the first calculating circuit or unit is arranged to create a check-sum formed from a selected polynomial.

18. The device of claim 14, wherein the main memory and/or the control memory comprises one or several FIFO memories.

19. The device of claim 14, wherein the means that are given to, or preceding, the main memory comprises a unit which classifies every information, intended to be inserted into one of several available categories.

20. The device of claim 14, wherein the digital information is structured into data packets or data cells.

21. The device of claim 14, wherein the bit positions and corresponding values of the digital information represent a classification of the digital information into a category.

22. The device of claim 19, wherein an available address position in the main memory is evaluated through the means given to, or preceding, the main memory.

23. The device of claim 14, wherein the control memory comprises a register in which selected information regarding a respective data packet, such as the calculated first control-sum-carrying bit positions and the address of the data packet and/or position in the main memory, is stored.

24. The device of claim 23, wherein information regarding the classification of respective data packet can be stored in the register.

25. The device of claim 14, wherein every information or data packet, within a certain category, can be read in turn through a readout circuit.

26. The device of claim 14, wherein the read information or data packet is accepted as correct even if there is a lack of agreement within a unit between further bit positions belonging to the data packet, if there is an agreement between the calculated first and second control-sum-carrying bit positions.

* * * * *